United States Patent
Wirth et al.

(10) Patent No.: US 11,933,697 B2
(45) Date of Patent: Mar. 19, 2024

(54) METHOD FOR CLOSED SAMPLING AND SAMPLING DEVICE

(71) Applicant: Boehringer Ingelheim International GmbH, Ingelheim am Rhein (DE)

(72) Inventors: Thomas Wirth, Stadecken-Elsheim (DE); Tim Baatz, Alzey (DE); Georg Dziewas, Urbar (DE)

(73) Assignee: Boehringer Ingelheim International GmbH, Ingelheim am Rhein (DE)

( * ) Notice: Subject to any disclaimer, the term of this patent is extended or adjusted under 35 U.S.C. 154(b) by 640 days.

(21) Appl. No.: 17/053,416

(22) PCT Filed: Apr. 29, 2019

(86) PCT No.: PCT/EP2019/060916
§ 371 (c)(1),
(2) Date: Nov. 6, 2020

(87) PCT Pub. No.: WO2019/214981
PCT Pub. Date: Nov. 14, 2019

(65) Prior Publication Data
US 2021/0364394 A1  Nov. 25, 2021

(30) Foreign Application Priority Data
May 7, 2018 (DE) ........................ 10 2018 207059.8

(51) Int. Cl.
*G01N 1/10* (2006.01)
*G01N 1/08* (2006.01)
*G01N 1/22* (2006.01)

(52) U.S. Cl.
CPC ............ *G01N 1/10* (2013.01); *G01N 1/22* (2013.01); *G01N 1/2226* (2013.01); *G01N 1/08* (2013.01)

(58) Field of Classification Search
CPC .......... G01N 1/10; G01N 1/2226; G01N 1/22; G01N 1/08
(Continued)

(56) References Cited

U.S. PATENT DOCUMENTS 7,487,688 B2 * 2/2009 Goodwin ............... C12M 27/02
73/863.81
9,493,278 B2 * 11/2016 Meinzinger ........ B65D 43/0202
(Continued)

FOREIGN PATENT DOCUMENTS

DE  8121463 U1 *  5/1982
DE  8121463 U1    5/1982
(Continued)

OTHER PUBLICATIONS

Qclabequipment.com, Disposable Sack Sampler/Probe for sampling from a bag, URL: https://www.coffeelabequipment.com/SAMPLER_SACK.pdf (www.qclabequipment.com), XP055604731, Mar. 9, 2013 (Mar. 9, 2013) 2 pg(s) (Year: 2013).*
(Continued)

*Primary Examiner* — Stephanie E Bloss
*Assistant Examiner* — Kevin C Butler
(74) *Attorney, Agent, or Firm* — Andrea V. Lockenour

(57) ABSTRACT

The invention relates to a method for closed sampling from filling plants comprising the following steps in:
- filling a sample quantity into a container (1) with a wall (3);
- applying a reinforcing element (20) to the container (1) with the wall;
- introducing a fracture point (22) into the wall of the container (1) in the area of the reinforcing element (20);
- introducing a sampling attachment (30) with hollow tube (40) into the wall of the container (1) in the area of the fracture point (22);

(Continued)

filling a sample container (50) connected to the hollow tube (40) once or several times;

removing the sample container (50) from the hollow tube (40) and closing the sample container (50);

removing the sampling attachment (30) with hollow tube (40) from the container; and sealing the fracture point (22) of the container in the area of the reinforcing element (20).

The subject matter of the invention is also a sampling device, in particular for carrying out the method.

15 Claims, 3 Drawing Sheets

(58) Field of Classification Search
USPC ........................................ 73/863.81
See application file for complete search history.

(56) References Cited

U.S. PATENT DOCUMENTS

| | | | |
|---|---|---|---|
| 11,175,188 B2 | 11/2021 | Goodwin | |
| 2007/0214899 A1* | 9/2007 | Goodwin | C12M 41/12 73/863 |
| 2009/0126515 A1* | 5/2009 | Goodwin | C12M 1/28 374/E1.001 |
| 2011/0113900 A1* | 5/2011 | Goodwin | C12M 23/26 374/E1.001 |
| 2014/0331795 A1* | 11/2014 | Goodwin | G01K 1/14 73/864.73 |
| 2015/0344195 A1* | 12/2015 | Meinzinger | B65D 51/185 414/800 |
| 2017/0307447 A1* | 10/2017 | Goodwin | C12M 23/46 |
| 2018/0321089 A1* | 11/2018 | Goodwin | C12M 29/06 |
| 2021/0364394 A1* | 11/2021 | Wirth | G01N 1/2226 |

FOREIGN PATENT DOCUMENTS

| | | | |
|---|---|---|---|
| DE | 102012101509 A1 * | 8/2013 | |
| DE | 102012101509 A1 | 8/2013 | |
| DE | 102006062982 B3 * | 10/2014 | |
| DE | 102006062982 B3 | 10/2014 | |
| DE | 102018207059 A1 * | 11/2019 | |
| EP | 1837640 A2 * | 9/2007 | |
| JP | 2005016961 A * | 1/2005 | |
| JP | 2005016961 A | 1/2005 | |
| WO | 199629587 A1 | 9/1996 | |

OTHER PUBLICATIONS

"Sack Master" Mar. 9, 2013, qclabequipment.com, XP55604731A, 2 pgs.

Burkle GmbH, Catalog (2018) 80-84, 168, https://www.buerkle.de/website/var/assets/catalog/de/2018/html/index.html, 13 pgs.

* cited by examiner

METHOD FOR CLOSED SAMPLING AND SAMPLING DEVICE

The invention relates to a method for closed sampling and a sampling device.

In order to be able to analytically examine substances, especially solids, produced in production plants, especially chemical production plants, samples of such solids are regularly taken. This is carried out by filling the manufactured substances (bulk goods) into smaller containers. For reasons of product protection and occupational safety, such filling is usually carried out in closed form. This both prevents foreign bodies (e.g. dust, fibers) from entering the container to be sampled (product protection) and employees from being exposed to product dusts (occupational safety).

In the prior art, this is achieved by using so-called endless liner systems. In order to be able to take samples of the bulk material from these filled containers for analytical purposes, it is necessary—as already described during filling—to carry out the sampling in closed form for product protection and occupational safety reasons.

In order to be able to carry out a closed sampling of solids from continuous liner filling plants, by taking into account the requirements of product and occupational safety, the prior art provides for manual or automatic sampling by means of special sampling constructions from the continuous liner plant. Although such sampling constructions with integrated exhaust air dedusting offer a very high degree of protection, this is not a completely closed process. For example, sample bottles can become contaminated on the outside and must then be cleaned with solvents, for example. Furthermore, such sampling is not suitable for products with poor flow properties.

Alternatively, it is provided in this respect to take a small quantity of product, e.g. 200 g, via the continuous liner filling system. This removed small quantity can then be cut open in a closed environment, for example in a disposable glove box made of plastic film, and be filled into sample bottles using a plastic spoon. The disadvantage of this is that it is a time-consuming process in which the sample bottles can also be contaminated from the outside and particulate contamination of the sample quantity with residues of the plastic film is possible. Depending on the test procedure specified, the particulate contamination resulting from the sampling process can lead to false-positive analytical results which prevent the release and thus the marketing of the affected solid batch, e.g. due to particulate contamination; affected batches must therefore be sent for destruction.

A third possibility is an open withdrawal of bulk materials, for example with sample collectors. The disadvantage here is that dusty products cannot be sampled without dust formation. Furthermore, sampling reduces the weight of the container, which requires new weighing and labelling.

It is thus the object of the invention to specify a method and a device, in particular for carrying out the method, which avoids the disadvantages of the prior art and in particular ensures that the solid products are filled into small sample containers for subsequent analysis, avoids dust exposure for the performing employees and protects the product both in the filling container (bulk goods) and sample container from external and/or particulate contamination.

According to the invention, this object is solved by a method for closed sampling from a filling plant according to claim 1 and a sampling device according to claim 5.

In the method according to the invention, a sample quantity is first filled into a container with a wall. After filling, a reinforcing element (hole reinforcer) is applied to the container with the wall. Then, a fracture point in the area of the reinforcing element is introduced into the wall of the container, e.g. by scoring, and a sampling attachment with a hollow tube is inserted into the wall of the container in the area of the fracture point. A sample container connected to the hollow tube is filled once or several times via the hollow tube that was inserted into the container. After filling with the sample quantity to be tested, the sample container is removed from the sampling attachment with hollow tube and then closed. After the taking of the samples is completed, the attachment with hollow tube is removed from the container with the wall and the fracture point in the area of the reinforcing element is closed.

In a particularly preferred embodiment of the invention, it is provided that for closed filling the sample container is connected to the sampling attachment with hollow tube via a screw connection. This has the advantage that the sample container can be very easily connected to the sampling attachment and removed from it again. A hole reinforcer with a largely circular inner contour is preferably used as a reinforcing element, wherein the hole reinforcer can be designed either with or without a sealing lip. The hole reinforcer, which is usually applied by means of a two-dimensional adhesive process, ensures that damage to the container wall after scoring or cutting is limited to the inner area of the hole reinforcer, since the two-dimensional adhesive prevents further tearing of the container wall. The hole reinforcer thus enables a tight connection between the outside of the hollow tube of the sampling attachment and the container wall. Hole reinforcers with a sealing lip have the advantage that the elasticity of the sealing lip provides a positive seal between the hollow tube and the container with the wall and reliably prevents the escape of solids.

In the area of the reinforcing element, the fracture point is inserted into the wall of the container, preferably by cutting, incising and/or scoring.

In addition to the method according to the invention for taking a sample quantity, the invention also provides a sampling device, preferably for carrying out the method. The sampling device according to the invention is characterized in that it comprises a container with a wall, wherein the container with the wall comprises a reinforcing element.

In addition, the sampling device is provided with a sampling attachment, preferably with a thread, wherein the sampling attachment is characterized in that it comprises a hollow tube which can be inserted into the container with the wall in the area of the reinforcing element.

In a further developed design of the invention it is provided that the container is a bag, in particular a plastic bag, preferably a polyethylene bag. Polyethylene bags are inexpensive and have the advantage that they can be produced from polyethylene granules which have a low plasticizer content and thus only release small amounts of plasticizer to the packaged product. In particular, transparent polyethylene bags are used to facilitate the sampling process, as the end of the inserted hollow tube can easily be seen during the described sampling process.

It is particularly preferable if the sampling device comprises a sample container which can be connected to the sampling attachment, preferably by means of a screw thread.

In a particularly preferred embodiment, it is provided that the thread is designed as a screw thread on the hollow tube. The sample container itself preferably has an external thread which can be connected to the screw-on thread on the hollow tube. The sample container is designed to hold a volume of e.g. 10 g to 2000 g, preferably 100 g to 400 g, especially preferably 200 g to 300 g.

The invention shall be described in the following, without limitation, by means of the figures, wherein:

FIGS. 1a-1f show the method steps of the method of closed sampling according to the invention.

Figure 1A:
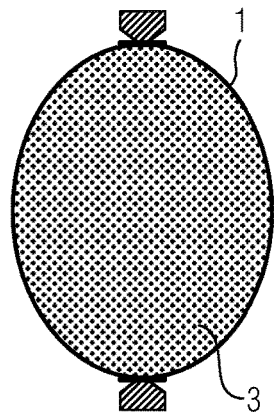
FIGS. 1a-1f show the various method steps of taking samples into a sample container by using the method of the invention.
Figure 1B:
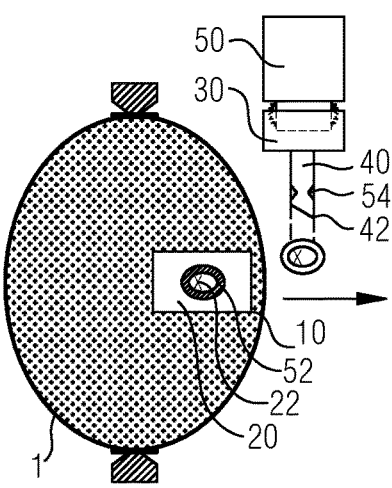

FIG. 1a shows a container 1 with a wall in which the substance 3 to be tested is placed. The container 1 is a container with a wall, preferably a kind of bag, in particular a plastic bag, preferably made of polyethylene. A reinforcing element 20 is applied to a point on the wall of the container 1, in this case marked 10. Within the recessed area of the reinforcing element 20, a fracture point 22 is introduced into the wall of container 1 (FIG. 1b). A sampling attachment 30 is then inserted into the fracture point in the area of the reinforcing element. The sampling attachment 30 comprises a hollow tube 40 and a sample container 50 attached to the sampling attachment. The hollow tube 40 has a bevel 42 at its front side, which is intended for penetration and serves to pierce the fracture point in the wall of the container. The insertion of the sampling attachment 30 with the hollow tube 40 into the wall of the container is shown in FIG. 1c.

Figure 1C:
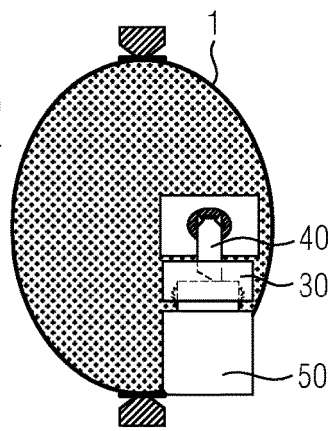
Figure 1D:
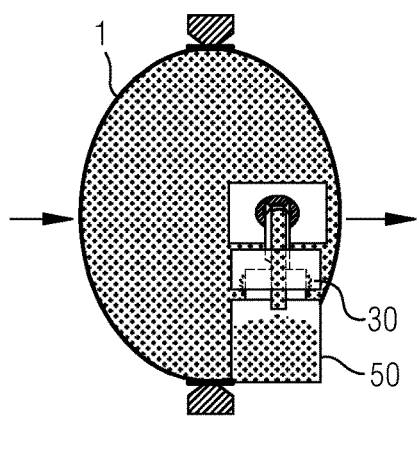
Figure 1E:
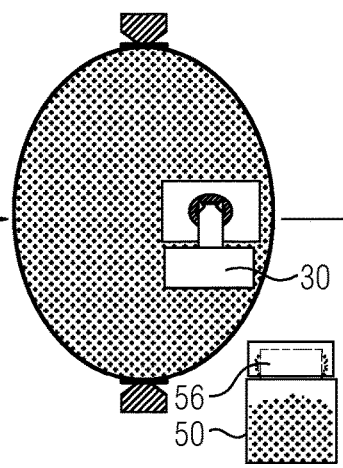
Figure 1F:
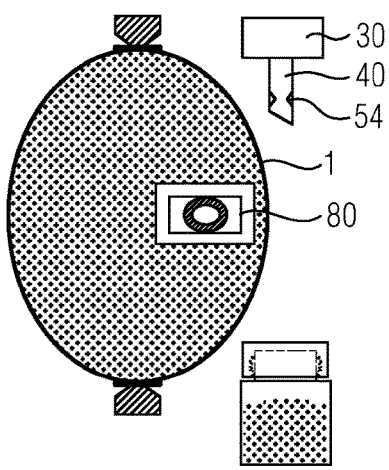

Clearly visible in FIG. 1c is the connection between the hollow tube and the inside of the container 1. The hollow tube, as shown in FIG. 1b, preferably has a circumferential groove 54, in which the inside of the hole reinforcer, or as in the present case the sealing lip 52 of a hole reinforcer with sealing lip, engages and provides a tight connection between the hollow tube and the wall of the container and thus the inside of the container. If the hollow tube provides a conductive connection for the filler received in the container, the filler is filled from container 1 into the sample container 50 connected to the sampling attachment 30, as shown in FIG. 1d. The sample container 50 is preferably connected to the sampling attachment 30 via a screw thread. After the sample container 50 has been filled with a predetermined sample quantity of filler from the container 1, the sample container 50 is unscrewed from the sampling attachment 30, as shown in FIG. 1e, with the sampling attachment 30 still inserted, and closed with a lid 56. After the sampling attachment 30 has been removed from the container as shown in FIG. 1f, the container 1 is closed at the point where the sampling attachment 30 with hollow tube 40 was inserted into the opening of the container. The closing of the opening is marked 80.

Figure 2A:
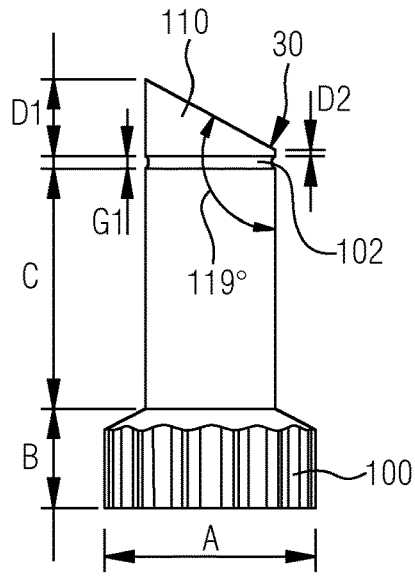
FIGS. 2a-2c show different views of a hollow tube with adapter for connecting a sample container.
Figure 2B:
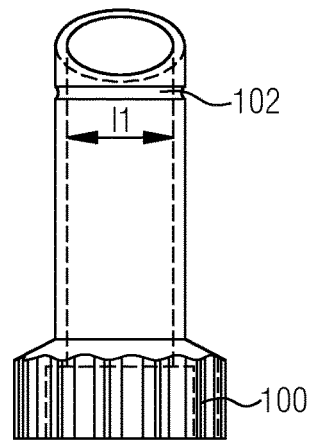
Figure 2C:
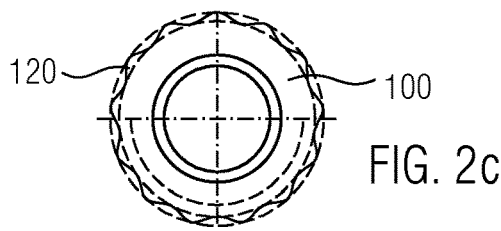

FIGS. 2a-2c show a possible design of a sampling attachment 30. The sampling attachment 30 comprises a screw-on thread 100 with a corrugation. The screw-on thread 100 can be designed in different ways. The function of the screw-on thread is the gapless and tight connection of the sample container to the sampling attachment 30. Instead of the screw connection as shown, other types of connection of the sample container to the sampling attachment 30 are also conceivable, for example a gapless and tight connection by means of a snap-in mechanism. The sampling attachment 30 has a groove 102; it can receive the inner edge of the opening of the hole reinforcer or—in the case of a hole reinforcer with sealing lip—the sealing lip surrounding the opening of the hole reinforcer and can tightly seal the connection of sampling attachment and container. The height of the hollow tube up to the groove is marked with letter C. Preferably, the height C is in the range of 0 mm to 100 mm, especially in the range of 25 mm to 80 mm, most preferably in the range of 40 mm to 70 mm. If the height C is less than 5 mm, handling of the sampling attachment becomes difficult because the groove is too close to the screw attachment and there is interaction between the container and the sampling attachment. If the height C of the hollow tube is greater than 100 mm, handling is also difficult because there is a long lever. The bevel 110 of the hollow tube of the sampling attachment 30 is characterized by the ratio of the height D1 and the height D2. The height ratio of D1 to D2 together with the outer diameter of the hollow tube determines the angle of the bevel. If the height D2 is selected with 1 mm and the height D1 with 22 mm, as in the present example, depending on inner diameter and wall thickness of the hollow tube, an angle of 119° results, for example (see below). Preferably, the height D1 is 5 mm to 50 mm, in particular 10 mm to 40 mm, most preferably 20 mm to 30 mm. If the height D1 is greater than 50 mm, there is the disadvantage that the bevel 110 dips too much into the container and hinders the flow of the solid, especially the powder, when taking samples into the sample container. At heights D1, which are less than 5 mm, there is practically no bevel, which is, however, required to pierce the cut film. In such a case the tip is blunt. The height D2 is in the range of 0.5 mm to 10 mm, preferably 1 mm to 8 mm, in particular 2 mm to 5 mm. If the height D2 is less than 0.5 mm, there is a risk that the sealing lip will slip out of the groove and the sampiing attachment will not hold. The angles resulting from the specified ranges of D1 and D2 are between 95° and 150°, preferably 100° to 140°, in particular 110° to 130°, most preferably 115° to 125°.

The wall thickness of the tube section of the hollow tube shown here, which is used as a pipette in this case, is in the range of 1 mm to 5 mm, preferably 2 mm to 4.5 mm, in particular 2.5 mm to 3.5 mm. With a groove depth of at least 0.5 mm for the sealing lip to latch into place, wall thicknesses of less than 1.5 mm are difficult to achieve, as otherwise the tube will be mechanically weakened too much at the point of the groove. The inner diameter I1 of the sampling attachment is between 10 mm and 50 mm, preferably 20 mm to 40 mm, in particular 25 mm to 35 mm. The inner diameter may vary as a function of the flow properties of the sample material to be taken. For sample material which flows with difficulty, inner diameters larger than 25 mm are advantageous, since only then blockage of the sampling attachment can be reliably avoided. The width G1 of the groove 102 is 0 mm to 6 mm, preferably 1 mm to 5 mm, in particular 2 mm to 4 mm. The groove width is adjusted to ensure the latching of the sealing lip.

In a further embodiment, the hollow tube of the sampling attachment has, in addition to the above-mentioned first groove 102, a second circumferential groove which can accommodate the inner edge of the opening of the hole reinforcer or—in the case of a hole reinforcer with sealing lip—the sealing lip surrounding the opening of the hole reinforcer and can tightly seal the connection between sampling attachment and container. The width of the second groove correlates with the width G1 of the first groove 102: It is 0 mm to 6 mm, preferably 1 mm to 5 mm, in particular 2 mm to 4 mm, and is adjusted to ensure the latching of the sealing lip. The depth of the second groove is preferably at least 0.5 mm. The second groove is located on the hollow tube between the thread and the first groove 102, preferably closer to the first groove than to the thread. The distance of the second groove from the outermost end of the immersion tip of the hollow tube, i.e. from the end of height D1, is preferably not more than 50 mm.

In this embodiment, the inside of the hole reinforcer or the sealing lip 52 of a hole reinforcer with sealing lip can engage in the first or in the second groove within the scope of the method for closed sampling according to the invention, so that a tight connection between the hollow tube and the wall of the container and thus the inside of the container is provided. If the second groove is engaged, the first groove 102 performs a securing function: If the hole reinforcer or the sealing lip should slip out of the second groove in the direction of the tip of the hollow tube, the hole reinforcer or the sealing lip can latch into the first groove so that an unintentional separation of the container from the hollow tube of the sampling attachment can be prevented.

FIG. 2b shows a three-dimensional view of a sampling attachment as shown in FIG. 2a, showing in particular the inner diameters I1. Identical components are marked with the same reference numbers.

FIG. 2c shows the top view of a screw-on thread with corrugation 120.

Figure 3:
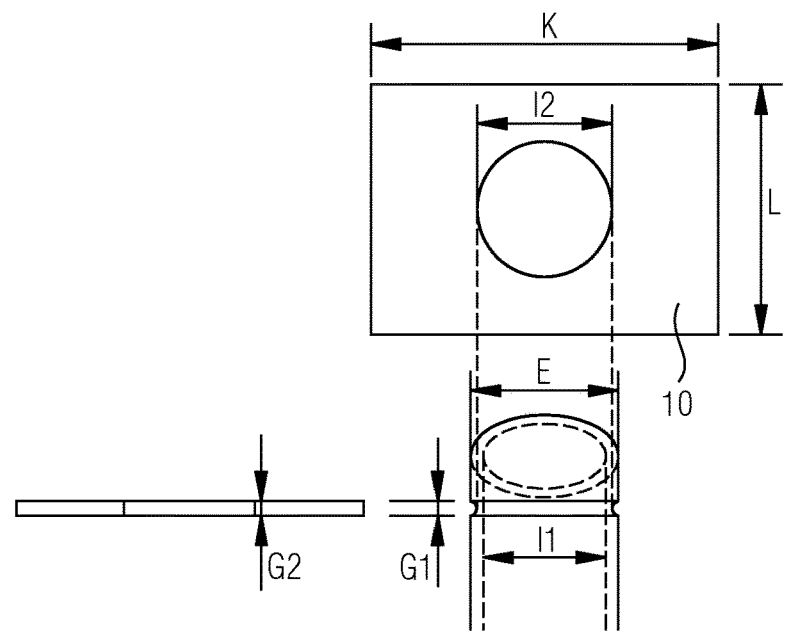
FIG. 3 shows a hole reinforcer without sealing lip.

FIG. 3 shows a hole reinforcer 10 without a sealing lip. The inner diameter I2 of the opening of hole reinforcer is determined by the outer diameter E of the immersion tip of the sampling attachment. Preferably, the difference E-I2 is between 0 mm and 5 mm, in particular 1 mm to 4 mm, most particularly preferably 2 mm to 3 mm. In the case of a hole reinforcer without a sealing lip, as in this case, the outer diameter E of the immersion tip in relation to the inner diameter I2 determines the force with which the hole reinforcer must be pulled over the tube before latching, and thus later the tightness of the connection. The thickness of the hole reinforcer G2 is in the range of 0.1 mm to 2 mm, preferably 0.2 mm to 1.5 mm, in particular 0.3 mm to 1 mm, and correlates with the groove width G1.

While the hole reinforcer shown has a rectangular shape with a length L and a length K, other geometric shapes are also possible, e.g. round shapes or polygons. The hole reinforcer must have a sufficiently large area around the opening to ensure that the glued reinforcer adheres to the container. The length differences L-I2 and K-I2 are in the range of 10 mm to 60 mm, preferably 20 mm to 50 mm, in particular 30 mm to 40 mm.

Figure 4:
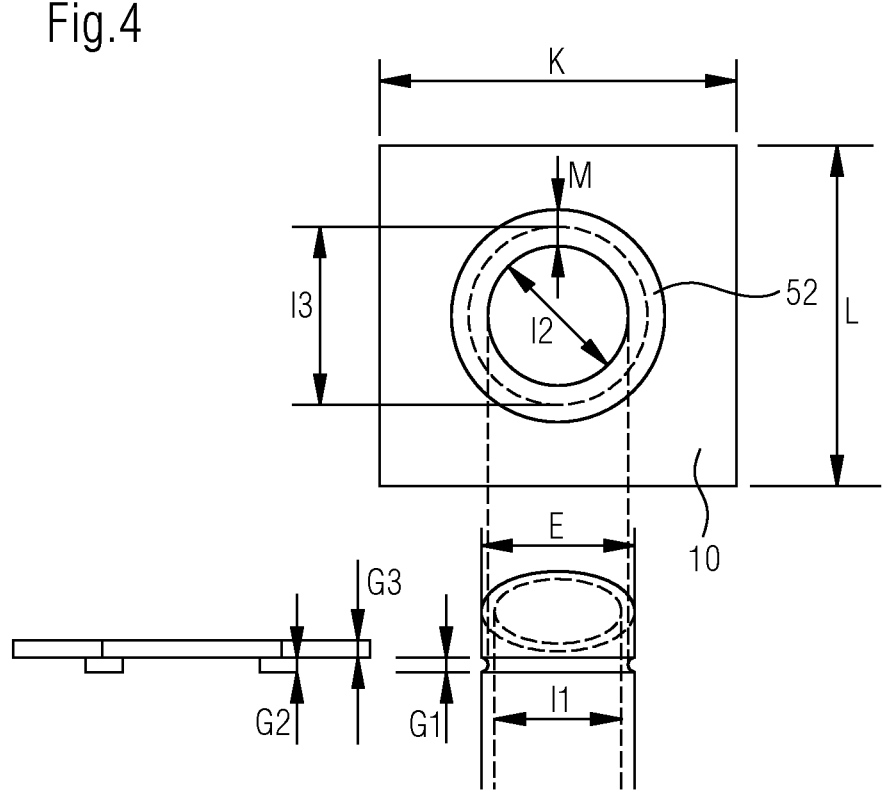
FIG. 4 shows a hole reinforcer with sealing lip.

FIG. 4 shows an alternative design of a hole reinforcer with a sealing lip. The hole reinforcer is again marked with the reference number 10. The inner diameter of the hole reinforcer opening is marked with the reference number I3, the inner diameter of the sealing lip 52 is marked I2. The inner diameter of the sealing lip is determined by the outer diameter of the immersion tip of the sampling attachment 30. Preferably, the difference E-I2 is between 0 mm and 5 mm, in particular 1 mm to 4 mm, most particularly preferably 2 mm to 3 mm. The inner diameter I3 of the opening of the hole reinforcer depends on the inner diameter of the sealing lip I2. Preferably, the difference I3-I2 is in the range of 0 mm to 5 mm, in particular 1 mm to 4 mm, most preferably 2 mm to 3 mm. The width of the sealing lip is designated M in this case and is in the range of 1 mm to 10 mm, preferably 2 mm to 8 mm, in particular 4 mm to 7 mm. The width of the sealing lip M must be selected so that the sealing lip has sufficient adhesion to the hole reinforcer to which it is bonded. In addition to the shown round outer contour of the sealing lip, other geometric contours such as round shapes or polygons are also possible. In a preferred embodiment, the outer contour of the sealing lip is rectangular, particularly preferably square.

The thickness of the sealing lip G2 in FIG. 4 is in the range of 0.1 mm to 4 mm, preferably 0.2 mm to 3 mm, in particular 0.3 mm to 2 mm. The outer dimensions of the hole reinforcer are to be selected as for the design according to FIG. 3, wherein its thickness in FIG. 4 is marked with G3.

With the invention, for the first time a method and a device are specified with which it is possible to extract materials, for example solids, from bulk material for analytical purposes, which avoid dust exposure for the performing employees (occupational safety) and protect the product both in the filling container (bulk material) and sample containers from external and/or particulate contamination (product protection).

The invention claimed is:

1. A method for closed sampling from filling plants, said method comprising the following steps:
    filling a sample quantity into a container (1) with a wall (3);
    applying a hole reinforcer with a sealing lip (20) to the exterior of the container (1) with the wall;
    introducing a fracture point (22) in the area of the hole reinforcer (20) into the wall of the container (1);
    introducing a sampling attachment (30) with hollow tube (40) into the wall of the container (1) in the area of the fracture point (22) wherein the hollow tube has a circumferential groove (54) and wherein the sealing lip (52) of the hole reinforcer engages and provides a tight connection between the hollow tube and the wall of the container via said circumferential groove;
    removing the sample container (50) from the hollow tube (40) and closing the sample container (50);
    removing the sampling attachment (30) with hollow tube (40) from the container; and
    sealing the fracture point (22) of the container in the area of the hole reinforcer with sealing lip (20).

2. A method according to claim 1, wherein the sample container (50) is connected to the hollow tube (40) via a screw connection for closed filling.

3. The method according to claim 1, wherein the fracture point is introduced into the wall of the container by cutting, incising and/or scoring in the area of the reinforcing element.

4. A sampling device for carrying out the method according to claim 1 having
    a container with a wall, comprising a hole reinforcer with a sealing lip on the exterior of the container;
    a sampling attachment with a thread; wherein the sampling attachment comprises a hollow tube groove, which can be inserted into the container in the region of the hole reinforcer with a sealing lip and wherein the hollow tube has a circumferential groove (54) and wherein the sealing lip (52) of the hole reinforcer engages and provides a tight connection between the hollow tube and the wall of the container via said circumferential groove.

5. A sampling device according to claim 4, wherein the container is a bag.

6. The sampling device according to claim 5, wherein the container is a plastic bag.

7. The sampling device according to claim 5, wherein the container is a polyethylene bag.

8. The sampling device according to claim 5, wherein the container is a transparent polyethylene bag.

9. A sampling device according to claim 4, wherein the sampling device comprises a sample container which can be connected to the sampling attachment.

10. A sampling device according claim 4, wherein the screw connection comprises a screw-on thread attached to the hollow tube.

11. A sampling device according to claim 4, wherein the screw connection comprises an external thread on the sample container which can be connected to the screw-on thread on the hollow tube.

12. A sampling device according to claim 4, wherein the sample container comprises a volume, accommodating a sample quantity.

13. A sampling device according to claim 12, wherein the sample quantity is in the range of 10 g to 2000 g.

14. The sampling device according to claim 12, wherein the sample quantity is in the range of 100 g to 400 g.

15. The sampling device according to claim 12, wherein the sample quantity is in the range of 200 g to 300 g.

* * * * *